(12) United States Patent
Yamada et al.

(10) Patent No.: US 6,457,723 B1
(45) Date of Patent: Oct. 1, 2002

(54) LIP-TYPE SEAL WITH A FLEXIBLE REINFORCEMENT MEMBER

(75) Inventors: Takeshi Yamada; Takayuki Kato, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/753,528

(22) Filed: Jan. 3, 2001

(30) Foreign Application Priority Data

Jan. 11, 2000 (JP) ........................................ 2000-002972

(51) Int. Cl.$^7$ ................................................. F16J 15/32
(52) U.S. Cl. ........................................................ 277/572
(58) Field of Search ................................ 277/562, 564, 277/565, 572, 553, 554, 555

(56) References Cited

U.S. PATENT DOCUMENTS 4,427,201 A * 1/1984 Belsanti
5,039,112 A * 8/1991 Ulrich et al.
6,123,514 A * 9/2000 Kawaguchi et al.
6,290,470 B1 * 9/2001 Okuno et al.

FOREIGN PATENT DOCUMENTS

| JP | U-2-47311 | 12/1990 |
|---|---|---|
| JP | U-2-146269 | 12/1990 |
| JP | U-4-134962 | 12/1992 |
| JP | A-6-58426 | 3/1994 |

* cited by examiner

Primary Examiner—Anthony Knight
Assistant Examiner—John L. Beres
(74) Attorney, Agent, or Firm—Woodcock Washburn LLP

(57) ABSTRACT

The lip-type seal comprises six members including the external annulus (20), the first seal member (30), the reinforcement member (40), the retention member (50), the second seal member (60) and the internal annulus (70). The first seal member (30) is made of elastomer and the second seal member (60) is made of synthetic resin. The reinforcement member (40) is formed as the insertion member in the first seal member (30) so that the reinforcement member (40) extends as far as the end of the hermetic space side of the first seal member (30) and the first seal member (30) exists on both sides of the reinforcement member (40). The reinforcement member (40) has flexibility to provide an appropriate tension which is generated by the deflection thereof, to the seal part (31a) when the inner pressure P in the hermetic space A becomes high, in a condition that the lip-type seal is attached to a compressor.

13 Claims, 4 Drawing Sheets

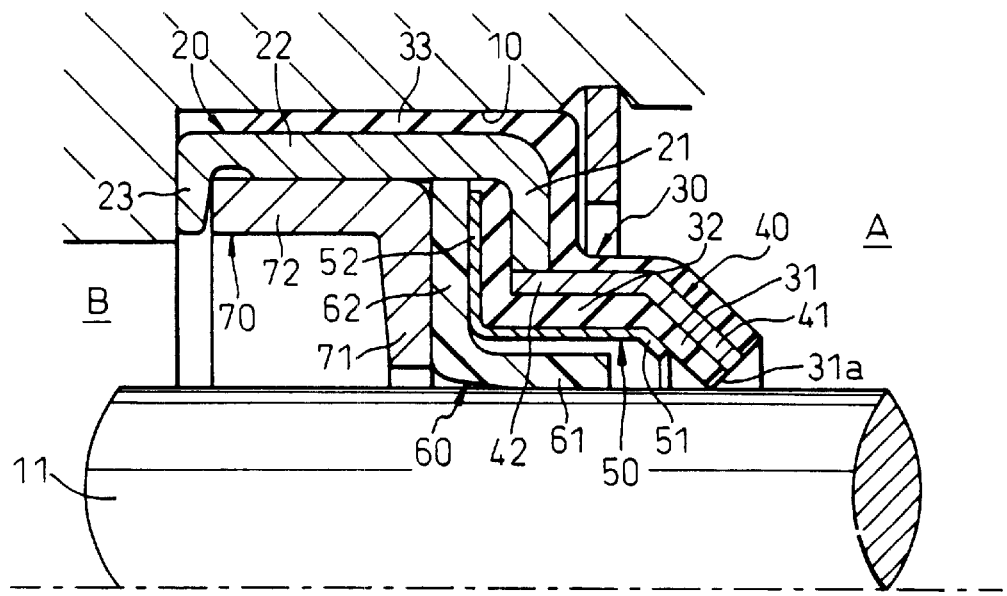
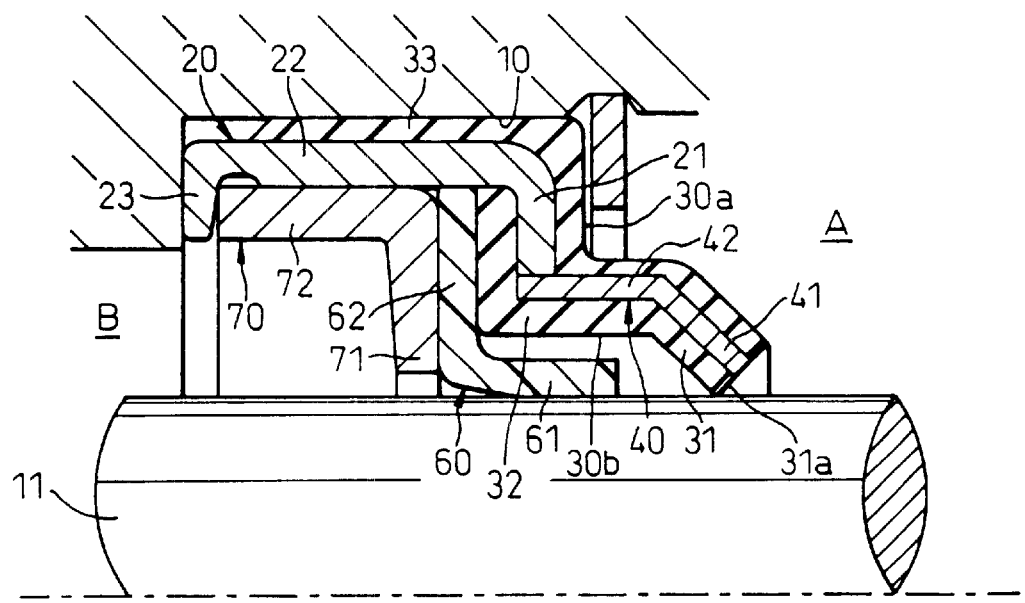

LIP-TYPE SEAL WITH A FLEXIBLE REINFORCEMENT MEMBER

BACKGROUND OF THE INVENTION

1. Field of the Invention

The present invention relates to a lip-type seal to be used to seal the outer circumference of the rotating shaft of a compressor which is used, for example, in an air conditioner.

2. Description of the Related Art

Conventionally, a lip-type seal of this kind comprises two seal members and includes a first seal member made of elastomer and a second seal member made of synthetic resin. The first seal member prevents refrigerant in a hermetic space or the like from leaking around the circumference of the shaft during rotation of the shaft. The second seal member not only functions as a negative pressure seal against the atmosphere when the pressure in the hermetic space becomes negative, but also supports a cylindrical part of the first seal member when the pressure in the hermetic space becomes high. In a configuration in which the second seal member supports the first seal member directly, the second seal member is pressed forcibly against the rotating shaft via the first seal member when the pressure in the hermetic space becomes higher than a predetermined value. As a result, the problem, in that a plastic deformation or cracks are generated due to frictional heat and leakage is caused, may occur. Moreover, since the first seal member is also pressed forcibly against the rotating shaft, a problem of excessive abrasion may also occur.

In order to solve these problems, a lip-type seal of the type in which the first seal member is supported by a rigid reinforcement member so that the pressure from the hermetic space side is not applied to the second seal member, has been presented. For example, a lip-type seal as shown in FIG. 6 has been disclosed in Japanese examined utility model publication (Kokoku) No. 2-47311.

The lip-type seal comprises a first seal member. 90 placed on the hermetic space A side, a second seal member 92 placed on the atmosphere B side opposite the first seal member 90 and an reinforcement member 91 which is placed between the first seal member 90 and the second seal member 92 and supports the atmosphere side of the first seal member 90. The reinforcement member 91 extends beyond the front end of the second seal member 92 as far as the hermetic space A side. In addition, the front end of the lip of the first seal member 90, which is pressed to and comes into contact with the rotating shaft, is not supported by the reinforcement member 91.

The hermetic space side of a lip-type seal is referred to as "front side" hereinafter.

In Japanese unexamined utility model publication (Kokai) No. 4-134962, a lip-type seal such as that shown in FIG. 7 has been disclosed. The lip-type seal comprises a forming ring (reinforcement member) 93, which covers the surface of the hermetic space A side of the first seal member 90 as far as the front end of the first seal member 90.

Moreover, in Japanese unexamined patent publication (Kokai) No. 6-58426, a lip-type seal such as that shown in FIG. 8 has been disclosed. In the lip-type seal, a thin sliding film 94 is formed at the front end of the first seal member 90. A reinforcement member 95 is attached so as to cover the hermetic space A side of the first seal member, excluding the sliding film 94;

In the lip-type seals disclosed in Japanese examined utility model publication (Kokoku) No. 2-47311 and Japanese unexamined patent publication (Kokai) No. 6-58426, however, reinforcement members 91 and 95 do not extend as far as the front end of the first seal member 90, so that a problem, in that parts of the front end of the first seal member 90, which are not covered by the reinforcement members 91 and 95 are deformed significantly and abrasion occurs when the pressure in the hermetic space A exceeds a predetermined value, appears.

In the lip-type seal disclosed in Japanese unexamined utility model publication (Kokai) No. 4-134962, since the rigid reinforcement member 93 covers as far as the front end, a problem, in that the first seal member 90 cannot adapt to the eccentricity or bias of the rotating shaft against the seal and sealing performance is deteriorated or abrasion of a partially contacted part develops quickly when the center of the rotating; shaft is biased from the center of the seal due to the error in attachment of the lip-type seal to the rotating shaft etc., may occur.

Moreover, since the reinforcement members 91, 93, and 95 in these conventional examples are made of rigid material, they do not have ability to adjust the contact force of the first seal member 90, and sealing performance is deteriorated if the tension is decreased due to the abrasion of the first seal member 90.

Recently, carbon dioxide gas has been considered for use as refrigerant gas, instead of fluorocarbon gas, in a compressor, but if carbon dioxide is used as refrigerant gas, there is the possibility that the pressure in the hermetic space is increased several times, and the above-mentioned problems become more conspicuous.

The present invention has been developed with above-mentioned problems being taken into consideration, and the purpose is to provide a lip-type seal which can suppress excessive abrasion by applying appropriate tension to the first seal member in a high pressure condition so as to suppress excessive deformation.

SUMMARY OF THE INVENTION

To realize the above-mentioned purpose, in the first aspect of the present invention, the lip-type seal comprises a first seal member, which is placed on the hermetic space side, made of elastomer and formed into an annular shape, and a second seal member, which is placed on the atmosphere side opposite the first seal member and radially inside of the first seal member, made of synthetic resin and formed into an annular shape, and the main target is that a nearly annular flexible reinforcement member of which the bending strength is higher than that of the first seal member is attached to the first seal member so that the reinforcement member extends as far as the end of the hermetic space side of the first seal member and at the same time, the first seal member is located at least radially inside the reinforcement member. Therefore, according to the present invention, an appropriate tension, which is generated by the inner pressure of the hermetic space side, can be applied to the first seal member while excessive abrasion by deformity can be suppressed.

In the second aspect of the present invention, the main target is that a retention member is provided between the first seal member and the second seal member to suppress deflection of the part of the first seal member opposite the second seal member in the radial direction, in the first aspect. Therefore, according to the present invention, in addition to the effect of the first aspect, interference of the first seal with the second seal member can be surely prevented even when the first seal member is deflected.

The present invention may be more fully understood from the description of the preferred embodiments of the invention, as set forth below, together with the accompanying drawings.

BRIEF DESCRIPTION OF THE DRAWINGS

In the drawings:

FIG. 1 is a partial sectional drawing of the lip-type seal in the first embodiment.

FIG. 2 is a partial sectional drawing of the lip-type seal in the second embodiment.

Figure 3:
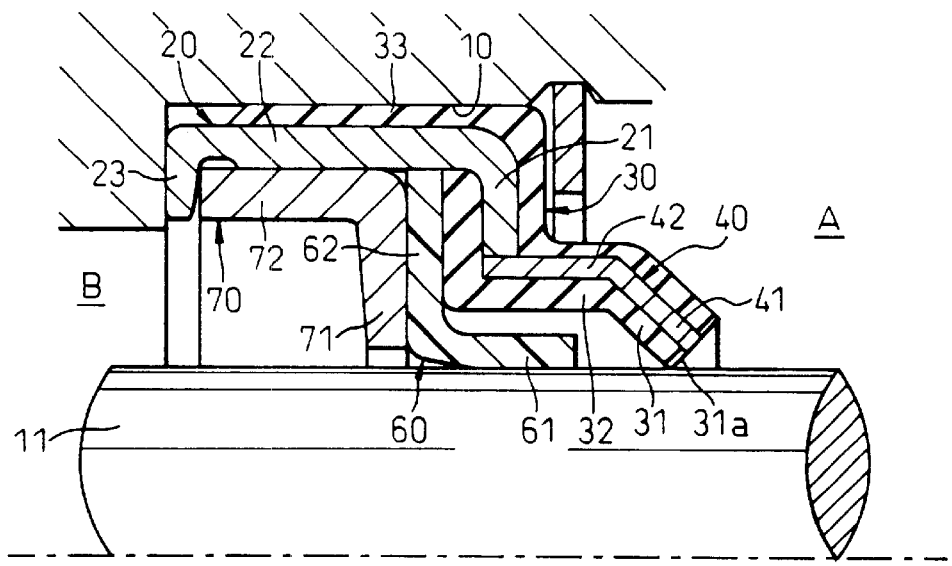
FIG. 3 is a partial sectional drawing of the lip-type seal in another embodiment.

DESCRIPTION OF THE PREFERRED EMBODIMENTS (First Embodiment)

The first embodiment of the present invention is described below with reference to FIG. 1.

FIG. 1 is a sectional drawing showing an upper half of the lip-type seal of the present invention, which is used as a shaft seal device of an air conditioner compressor and is attached to the rotating shaft 11.

In this embodiment, the right side of FIG. 1, that is, the hermetic space A side of a compressor, is referred to as "front side" of the lip-type seal.

The lip-type seal comprises six members, that is, an external annulus 20, a first seal member 30, a reinforcement member 40, a retention member 50, a second seal member 60, and an internal annulus 70.

The external annulus 20 and the reinforcement member 40 are formed as insertion members of the first seal member 30. The external annulus 20 is made of metal, comprising a cylindrical part 22, a flange 21 formed by being bent inward at the front end thereof and a caulked part 23 formed at the rear end. The reinforcement member 40 is made of a resin, the bending strength of which is higher than the elastomer of which the first seal member 30 is made, comprising a cylindrical part 42 with a constant diameter and a tapering part 41, which is connected to the cylindrical part 42 and the radius decreases gradually in the front side direction. The external annulus 20 and reinforcement member 40 are inserted into the first seal member 30 of elastomer, which is formed therewith, in the condition that the cylindrical part 42 of the reinforcement member 40 is inserted from the front side of the external annulus 20 toward the flange 21.

The first seal member 30 is formed so that the reinforcement member 40 and the flange 21 are embedded entirely therein and at the same time, almost all the outer circumferential surface of the cylindrical part 22 of the external annulus 20 is covered therewith. That is, the first seal member 30 is formed into the continuous dual annular shape at the front end side of the tapering part 41 of the reinforcement member 40 and has a cylindrical part 32 that extends in parallel to the rotating shaft 11 and the tapering part 31, in which the radius decreases gradually in the front side direction. The first seal member 30 is formed so that a part thereof opposite the front end of the tapering part 41 is thin and the other part thereof is thick. The inside of the front end of the tapering part 31 is a seal part 31a, which slidably comes into contact with the rotating shaft 11, and the part thereof opposite the cylindrical part 22 of the external annulus 20 is a fitting part 33 which is pressed when installed in a compressor.

The reinforcement member 40 is formed so as to have flexibility to provide an appropriate tension, generated by deflection thereof, to the seal part 31a when the inner pressure P in the hermetic space A becomes high, in a condition that the lip-type seal is attached to a compressor. Therefore, the appropriate flexibility of the reinforcement member 40 differs in accordance with the inner pressure P, while in operation, of a compressor in which the lip-type seal is used.

The retention member 50, the second seal member 60 and the inner annulus 70 are placed in predetermined positions in order of the retention member 50, the second seal member 60, and the inner annulus 70, between the caulked part 23 and the flange 21 inside the cylindrical part 22 of the external annulus 20.

Both the retention member 50 and the second seal member 60 comprise cylindrical parts 51 and 61 that extend in parallel to the cylindrical part 42 of the reinforcement member 40, and flanges 52 and 62 formed at the rear thereof, and are formed into a nearly L-shaped section. The retention member 50 is made of metal and the second seal member 60 is made of synthetic resin. The cylindrical part 61 of the second seal member 60 is formed so as to extend almost as far as the front end of the cylindrical part 42 of the reinforcement member 40, and the cylindrical part 51 of the retention member 50 is formed so as to extend beyond the cylindrical part 61 of the second seal member 60. The inner annulus 70, made of metal, comprises a cylindrical part 72 and a flange 71 formed at the front end thereof by being bent inward and formed into a nearly L-shaped section.

The entire face of the retention member 50, opposing the first seal member 30, comes into contact with the first seal member 30, and is interposed between both seal members 30 and 60 while the flange 52 comes into contact with the second seal member 60. The inner annulus 70 is arranged so that the rear end of the cylindrical part 72 thereof comes into contact with the caulked part 23 and is placed so that the flange 71 thereof comes into contact with the flange 62 of the second seal member 60.

This lip-type seal is assembled in steps in which the retention member 50, the second seal member 60 and the internal annulus 70 are positioned against the external annulus 20, of which the caulked parts 23 is not folded yet, and the first seal member 30, which is inserted and formed with the reinforcement member 40 so that each flanges thereof 52 and 62 and the cylindrical part 72 come to contact with the inside of external annulus 20, and the caulked part 23 is then folded inside.

The operation of the lip-type seal configured as above is described next. The lip-type seal is attached so that the fitting part 33 is pressed to the wall face of a recess 10 formed in a housing of a compressor, and installed for use in the compressor so that the seal part 31a of the first seal member 30 and the cylindrical part 61 of the second seal member 60 come into contact with the circumferential surface of the rotating shaft 11 that is inserted in the compressor.

The rotating shaft 11 rotates while the seal part 31a of elastomer slidably contacts with the rotating shaft 11. Even when the pressure in the hermetic space A becomes high, the seal part 31a keeps sealing performance while being pressed to and coming into contact with the rotating shaft 11 by an appropriate tension due to existence of the retention member 50.

The present embodiment has the following effects.

(1) Due to the existence of the annular reinforcement member 40 with higher bending strength than the first seal member 30, the deformation of the first seal member 30 is suppressed to prevent excessive abrasion of the seal part 31a, and the durability thereof is improved when the pressure in the hermetic space A becomes high.

(2) Since the reinforcement member 40 applies an appropriate tension to the first seal member 30 based on the inner pressure of the hermetic space A side, the deterioration of sealing performance, due to the decrease of the tension applied to the first member 30 by wear thereof, can be prevented even if the rotating shaft 11 is installed with the center thereof being biased.

(3) Since the retention member 50 prevents the deflection of the part of the first seal member 30 opposite the second seal member 60, the interference to the second seal member 60 can be avoided surely and the abrasion of the second seal member 60 can be prevented even if the pressure in the hermetic space A becomes high.

(4) Because of the existence of the retention member 50, the flexibility can be adjusted easily.

(5) Because the reinforcement member 40 is made of synthetic resin, manufacturing is facilitated and a reduction in weight can be realized.

(Second Embodiment)

Next, the second embodiment of the present invention is described below with reference to FIG. 2. In this embodiment the same parts as in the first embodiment are referred by the like reference numbers and the descriptions thereof are omitted. Therefore, only the points different from those in the first embodiment are explained hereinafter.

As shown in FIG. 2, the retention member 50 is omitted, and the first seal member 30 comprises two elements, including an external seal member 30a attached to the outer circumferential surface of the reinforcement member 40 and an internal seal member 30b attached to the inner circumferential surface of the reinforcement member 40.

A space is provided between the internal seal member 30b and the second seal member 60. The space is capacious enough to prevent interference of the internal seal member 30b with the second seal member 60 when the first seal member 30 is deflected. The external seal member 30a and the internal seal member 30b are adhered to the reinforcement member 40 using an adhesive.

The present embodiment has the following effect in addition to those explained for the first embodiment except effects related to the retention member 50, that is (3) and (4).

(6) Because the retention member 50 is omitted, the number of parts can be reduced, resulting in easier assembly.

While not limited to the above-mentioned configurations of embodiments, the following configurations are available, for example.

As shown in FIG. 3, the configuration in which the retention member 50 is omitted from the first embodiment is available. In this configuration, the number of parts can be reduced, resulting in easier assembly.

Figure 4:
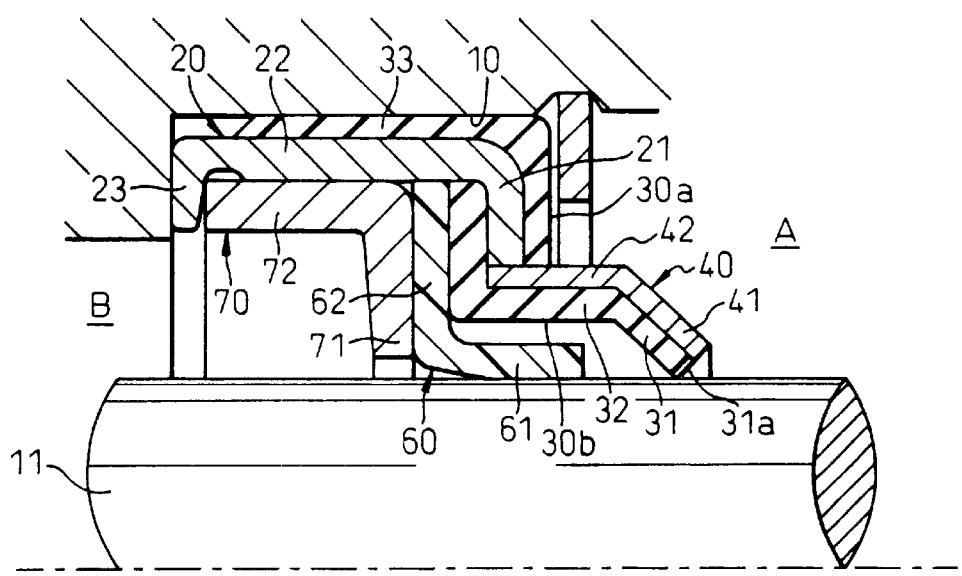
FIG. 4 is a partial sectional drawing of the lip-type seal in another embodiment.

As shown in FIG. 4, the configuration in which the part of the external seal member 30a opposite the reinforcement member 40 is omitted is available. In this configuration, only the internal seal member 30b is adhered to the reinforcement member 40.

The reinforcement member 40 may be made of metal. In this configuration, the durability of the reinforcement member can be improved compared to that made of synthetic resin.

The reinforcement member 40 may be made of elastomer material with more rigidity and higher bending strength than the first seal member 30. In this configuration, the weight of the reinforcement member can be reduced.

Figure 5A:
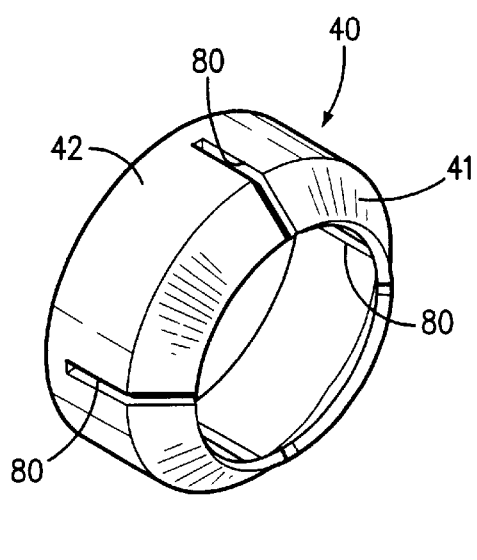
FIG. 5(A) is a perspective drawing of the reinforcement member in another embodiment.
Figure 5B:
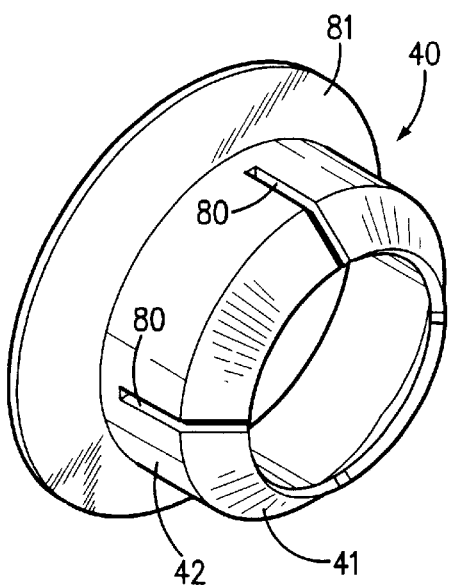
FIG. 5(B) is a perspective drawing of the reinforcement member in another embodiment.
Figure 6:
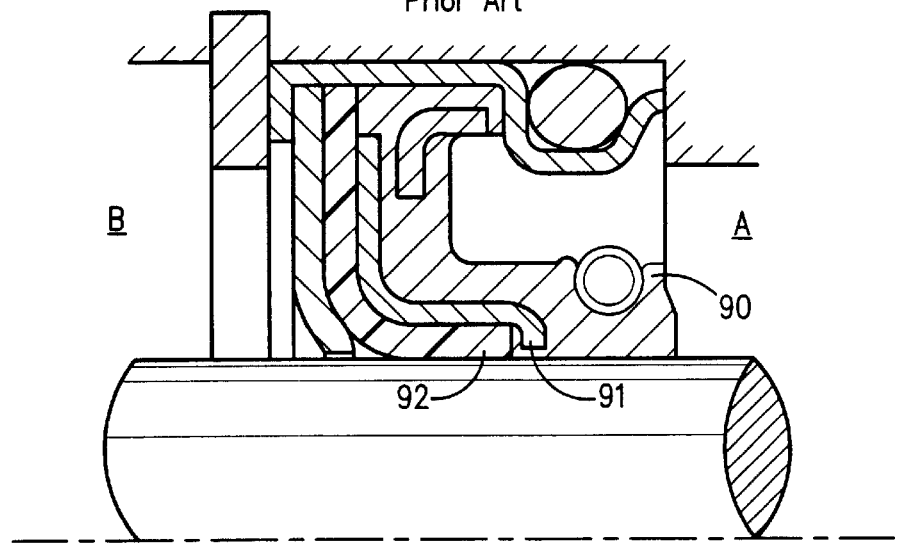
FIG. 6 is a partial sectional drawing of the lip-type seal in the conventional art.
Figure 7:
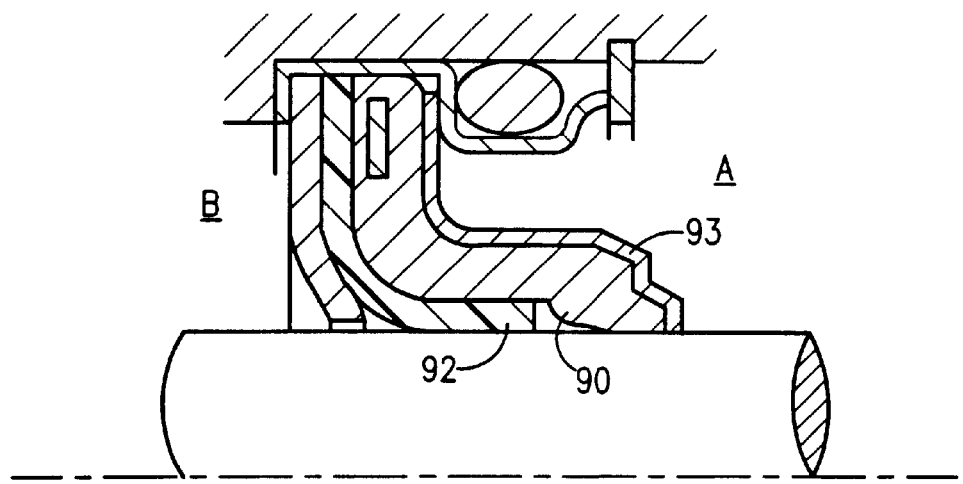
FIG. 7 is also a partial sectional drawing of the lip-type seal in the conventional art.
Figure 8:
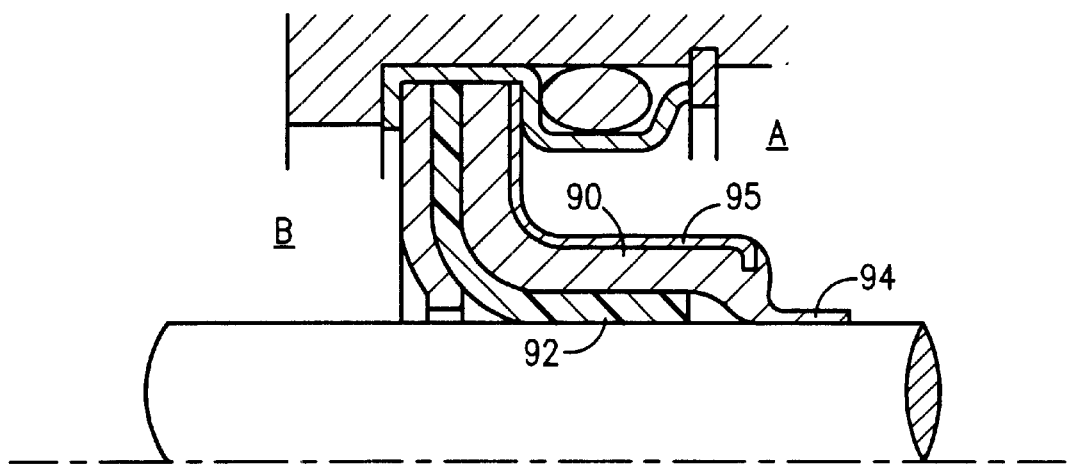
FIG. 8 is a partial sectional drawing of the lip-type seal in the conventional art.

As shown in FIG. 5 (A), plural slits 80, spaced evenly, may be provided to the reinforcement member 40 in the first and second embodiments. In this configuration, in addition to the effects of the first and second embodiments, the adjustment of the flexibility of the reinforcement member 40 can be facilitated. This is more effective when the reinforcement member 40 is made of metal. Moreover, a flange 81 may be provided as shown in FIG. 5 (B). In this configuration, in addition to the effects of the first and the second embodiments, the contact between the reinforcement member 40 and the external annulus 20 is more rigid.

The reinforcement member 40 may be formed, by plural divided parts, into an annular shape as a whole in the first and second embodiments.

Though the first seal member 30 is integrated into the external annulus 20 in each lip-type seal in the above-mentioned embodiments, it is also possible, to apply the configuration of the present invention to the lip-type seals, as those disclosed in Japanese examined utility model publication (Kokoku) No. 2-47311 and Japanese unexamined patent publication (Kokai) No. 6-58426, in which the first seal member, the second seal member and the like, are housed inside the annular metal case and the case is attached with a pressing force into the recess formed in a housing via a packing such as an O-ring.

Technical ideas except those described in the attendant claims, which can be appreciated from each above-mentioned embodiment, are described below with their effects.

Any one of the first through sixth aspects of the present invention includes a configuration, in which the first seal member is inserted and formed with the annular external annulus having a caulked part and a flange, each of which being bent inward, and the reinforcement member, in a condition that said reinforcement member is inserted into the flange. In this case, the seal can be installed in required position while keeping the sealing performance without an O-ring.

While the invention has been described by reference to specific embodiments chosen for the purposes of illustration, it should be apparent that numerous modifications could be made thereto by those skilled in the art without departing from the basic concept and scope of the invention.

What is claimed is:

1. A lip-type seal comprising:
  a first seal member, which is placed on a hermetic space side, made of elastomer and formed into an annular shape; and
  a second seal member, which is made of synthetic resin, formed into an annulus and placed on an atmosphere side opposite the first seal member and inside thereof;

wherein, a substantially annular-shaped flexible reinforcement member with a higher bending strength than that of the first seal member is attached to the first seal member so that tension is applied to the first seal member in a high pressure condition to suppress excessive radially inward deformation and abrasion of the first seal member, and wherein the reinforcement member extends as far as the end of the hermetic space side of the first seal member and the first seal member is located at least inside thereof.

2. A lip-type seal as set forth in claim 1, wherein a retention member is provided between the first seal member and the second seal member to suppress the deflection of the part of the first member opposite the second seal member in the radial direction.

3. A lip-type seal, as set forth in claim 1, wherein the reinforcement member is made of synthetic resin.

4. A lip-type seal, as set forth in claim 1, wherein the reinforcement member is made of metal.

5. A lip-type seal, as set forth in claim 1, wherein the reinforcement member is made of an elastomer which is harder and has higher bending strength than the first seal member.

6. A lip-type seal, as set forth in claim 1, wherein the reinforcement member is an annular and flexible member with slits.

7. A lip-type seal, as set forth in claim 1, wherein the first seal member is arranged on both an inside of the reinforcement member and an outside thereof.

8. A lip-type seal comprising:
   a first seal member, which is placed on a hermetic space side, made of elastomer and formed into an annular shape;
   a flexible reinforcement member embedded entirely within the first seal member; and
   a second seal member, which is made of synthetic resin, formed into an annulus and placed on an atmosphere side opposite the first seal member and inside thereof;
   wherein the reinforcement member has a higher bending strength than that of the first seal member and extends as far as the end of the hermetic space side of the first seal member.

9. A lip-type seal, as set forth in claim 8, wherein a retention member is provided between the first seal member and the second seal member to suppress the deflection of the part of the first seal member opposite the second seal member in the radial direction.

10. A lip-type seal, as set forth in claim 8, wherein the reinforcement member is made of synthetic resin.

11. A lip-type seal, as set forth in claim 8, wherein the reinforcement member is made of metal.

12. A lip-type seal, as set forth in claim 8, wherein the reinforcement member is made of an elastomer which is harder and has higher bending strength than the first seal member.

13. A lip-type seal, as set forth in claim 8, wherein the reinforcement member is substantially annular-shaped and includes slits formed therein.

* * * * *